US008390855B2

(12) United States Patent
Kano

(10) Patent No.: US 8,390,855 B2
(45) Date of Patent: Mar. 5, 2013

(54) APPARATUS, METHOD AND RECORDING MEDIUM FOR OBTAINING UI PAGES FROM SERVER

(75) Inventor: Takahiro Kano, Toyonaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 748 days.

(21) Appl. No.: 12/544,092

(22) Filed: Aug. 19, 2009

(65) Prior Publication Data

US 2010/0053674 A1 Mar. 4, 2010

(30) Foreign Application Priority Data

Aug. 29, 2008 (JP) ................................. 2008-222752

(51) Int. Cl.
 *G06F 3/12* (2006.01)
(52) U.S. Cl. ...... 358/1.15; 358/1.16; 709/203; 709/217; 709/219; 710/62; 718/100
(58) Field of Classification Search .................. 358/1.15, 358/1.13, 1.16; 705/1.1, 342; 709/202, 203, 709/217, 219; 710/62; 715/234; 718/100
See application file for complete search history.

(56) References Cited

U.S. PATENT DOCUMENTS

| 6,067,558 | A | * | 5/2000 | Wendt et al. ................ 709/202 |
| 2002/0045422 | A1 | * | 4/2002 | Iwase et al. ........................ 455/1 |
| 2003/0103226 | A1 | * | 6/2003 | Nishio .......................... 358/1.13 |
| 2004/0205621 | A1 | * | 10/2004 | Johnson et al. ................ 715/523 |
| 2004/0212824 | A1 | * | 10/2004 | Ohara .......................... 358/1.15 |
| 2005/0091700 | A1 | * | 4/2005 | Ohno et al. ..................... 725/133 |
| 2007/0027987 | A1 | * | 2/2007 | Tripp et al. .................... 709/225 |
| 2007/0115502 | A1 | * | 5/2007 | Sato ............................. 358/1.15 |

FOREIGN PATENT DOCUMENTS

| JP | 11-249849 | 9/1999 |
| JP | 2003-108354 | 4/2003 |
| JP | 2007-034576 A | 2/2007 |

OTHER PUBLICATIONS

Machine translation of JP 11-249849.*
Machine translation of JP 2003-108354.*
Japanese Notification of Reasons for Refusal mailed Jun. 15, 2010, directed to counterpart Japanese Patent Application No. 2008-222752; 4 pages.

* cited by examiner

*Primary Examiner* — King Poon
*Assistant Examiner* — David S Cammack
(74) *Attorney, Agent, or Firm* — Morrison & Foerster LLP

(57) ABSTRACT

A display accesses an external server via a browser installed on an image processing apparatus, and displays on itself via the browser, a job instruction screen of the external server, based on screen data of the job instruction screen. When a user specifies a job, a job issuance requester requests the external server to issue the job and accordingly the external server issues the job. And a receiver receives the issued job and a job executor executes the received job. And then, a display controller makes the display to display a screen that matches a result of the receiver's job receipt and/or a job execution status of the job executed by the job executor.

21 Claims, 9 Drawing Sheets

| Screen | URL |
|---|---|
| Job successful receipt screen | http://www.abc····· |
| Job unsuccessful receipt screen | http://www.def····· |
| Job execution screen | http://www.hij····· |
| Paper jam error screen | http://www.klm····· |
| Toner empty error screen | http://www.opq····· |
| Paper empty error screen | http://www.rst····· |
| Job completion screen | http://www.uvw····· |
| ⋮ | ⋮ |

FIG.5

The following data is successfully received.

| | | |
|---|---|---|
| File Name | : | FileName.pdf |
| Format | : | PDF |
| Size | : | 512KB |
| Color | : | Full-color |
| Creation Date | : | 2008/11/28 |
| Last Update Date | : | 2008/12/24 |

The following data is now being printed out.

| | | |
|---|---|---|
| File Name | : | FileName.pdf |
| Format | : | PDF |
| Size | : | 512KB |
| Color | : | Full-color |
| Creation Date | : | 2008/11/28 |
| Last Update Date | : | 2008/12/24 |

APPARATUS, METHOD AND RECORDING MEDIUM FOR OBTAINING UI PAGES FROM SERVER

This application claims priority under 35 U.S.C. §119 to Japanese Patent Application No. 2008-222752 filed on Aug. 29, 2008, the entire disclosure of which is incorporated herein by reference in its entirety.

BACKGROUND OF THE INVENTION

1. Field of the Invention

The present invention relates to an image processing apparatus such as a multifunctional digital image forming apparatus (MFP: Multi Function Peripheral) collectively having the copy function, the print function, the FAX function and other functions, a job execution method of the image processing apparatus, and a computer readable recording medium having a job execution program recorded therein to make a computer of the image processing apparatus execute processing.

2. Description of the Related Art

The following description sets forth the inventor's knowledge of related art and problems therein and should not be construed as an admission of knowledge in the prior art.

Among the image processing apparatuses such as the above-described multifunctional digital image forming apparatuses, there is an image processing apparatus having an installed browser that is application software to view Web pages. Installation of this browser provides the image forming apparatus, a function to display on an operation panel thereof, a job instruction screen of an external server (i.e. a job instruction screen set by an external server), and remotely instruct the external server to issue a job.

This image processing apparatus allows users to view document data recorded in the external server and gives a print instruction, via the browser installed thereon by operating the operation panel.

More concretely, via the browser, the image processing apparatus accesses the external server and requests the external server to provide screen data of a job instruction screen of the external server. And also via the browser, the image processing apparatus displays the job instruction screen on the operation panel, based on the screen data that is transmitted by the external server in response to the request.

Referring to the job instruction screen of the external server, which is displayed on the operation panel, a user specifies subject data to be processed and a subject job to be executed, for example a print job. And then, the image processing apparatus transmits to the external server, a CGI (Common Gateway Interface) request for issuance of the specified job. Receiving the job issuance request, the external server issues the job, and the job is executed by the image processing apparatus. Furthermore, the external server transmits to the image processing apparatus, a result of receipt of the CGI request, in other words, a notice telling that a job is properly issued in response to the job issuance request received from the image processing apparatus, and this notice is displayed on the operation panel of the image processing apparatus.

Meanwhile, as disclosed in Japanese Unexamined Laid-open Patent Publication No. 2007-034576, there is a technology intended to improve the operability by well coordinating contents stored inside and contents obtained from outside if those are displayed by different browsers.

A communication between the above-described browser installed on the image processing apparatus and the external apparatus is performed over HTTP (HyperText Transfer Protocol), although subject data to be processed according to a job is transmitted over another protocol, for example LPR (Line PRinter daemon protocol). If HTRP is employed, a screen displayed on a display of the image processing apparatus only can be updated according to a request given via the browser, and never can be updated according to a screen update instruction given by the server.

In conventional practice, a notice telling that a job is properly issued by the external server, which is a result of receipt of a CGI request, is transmitted to the image processing apparatus, then displayed on the operation panel of the image processing apparatus, as described above. However, a screen displayed thereon never can be updated after that. Thus, a notice telling whether or not a job is successfully transmitted (received by the image processing apparatus) is not displayed thereon and there is no way for the user to know a result of job transmission.

And a job execution of the image processing apparatus is an operation that is performed inside of the image processing apparatus not depending on a protocol employed by the external server. Thus, information indicating whether or not the job is successfully executed and whether or not an error occurs and other information are not displayed on the operation panel of the image processing apparatus.

As described above, the conventional image processing apparatus that allows users to instruct an external server to issue a print job, via the browser by operating the operation panel, does not allow them to know a result of job receipt and/or a job execution status after the job is properly issued by the external server, which is not convenient.

And the technology disclosed in the publication above does not provide a complete solution against the problem.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that allows users to instruct an external server to issue a job, via a browser by operating an operation panel, and enhances user convenience by further allowing users to know a result of job receipt and/or a job execution status after the job is properly issued by the external server.

It is another object of the present invention to provide a job execution method of the image processing apparatus, which allows users to know a result of job receipt and/or a job execution status after the job is properly issued by the external server.

It is yet another object of the present invention to provide a computer readable recording medium having a job execution program recorded therein to make a computer of the image processing apparatus execute processing by the job execution method.

According to a first aspect of the present invention, an image processing apparatus includes:

a display that accesses an external server via a browser, and displays on itself via the browser, a job instruction screen usually of the external server, based on screen data of the job instruction screen, which is received from the external server;

a job issuance requester that requests the external server to issue a job that is specified by a user via the job instruction screen of the external server, which is displayed on the display;

a receiver that receives the job that is issued by the external server in response to the request of the job issuance requester;

a job executor that executes the received job;

a detector that detects a result of the job receipt by the receiver and/or a job execution status of the job execution by the job executor; and a display controller that makes the display to display a screen that matches the detected result of job receipt and/or job execution status.

According to a second aspect of the present invention, a job execution method of an image processing apparatus includes:

accessing an external server via a browser, and displaying on a display via the browser, a job instruction screen of the external server, based on screen data of the job instruction screen, which is received from the external server;

requesting the external server to issue a job that is specified by a user via the job instruction screen of the external server, which is displayed on the display;

receiving the job that is issued by the external server in response to the recent job issuance request;

executing the received job;

detecting a result of the recent job receipt and/or a job execution status of the recent job execution; and making the display to display a screen that matches the detected result of job receipt and job execution status.

According to a third aspect of the present invention, a computer readable recording medium having a job execution program recorded therein to make a computer of an image processing apparatus execute:

accessing an external server via a browser, and displaying on a display via the browser, a job instruction screen of the external server, based on screen data of the job instruction screen, which is received from the external server;

requesting the external server to issue a job that is specified by a user via the job instruction screen of the external server, which is displayed on the display;

receiving the job that is issued by the external server in response to the recent job issuance request;

executing the received job;

detecting a result of the recent job receipt and/or a job execution status of the recent job execution; and making the display to display a screen that matches the detected result of job receipt and job execution status.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 5 is a view showing a list of URLs holding image data that match respective results of job receipt and/or job execution statuses;

FIGS. 6A and 6B depict screens to explain how the screen displayed on a display of an operation panel changes;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
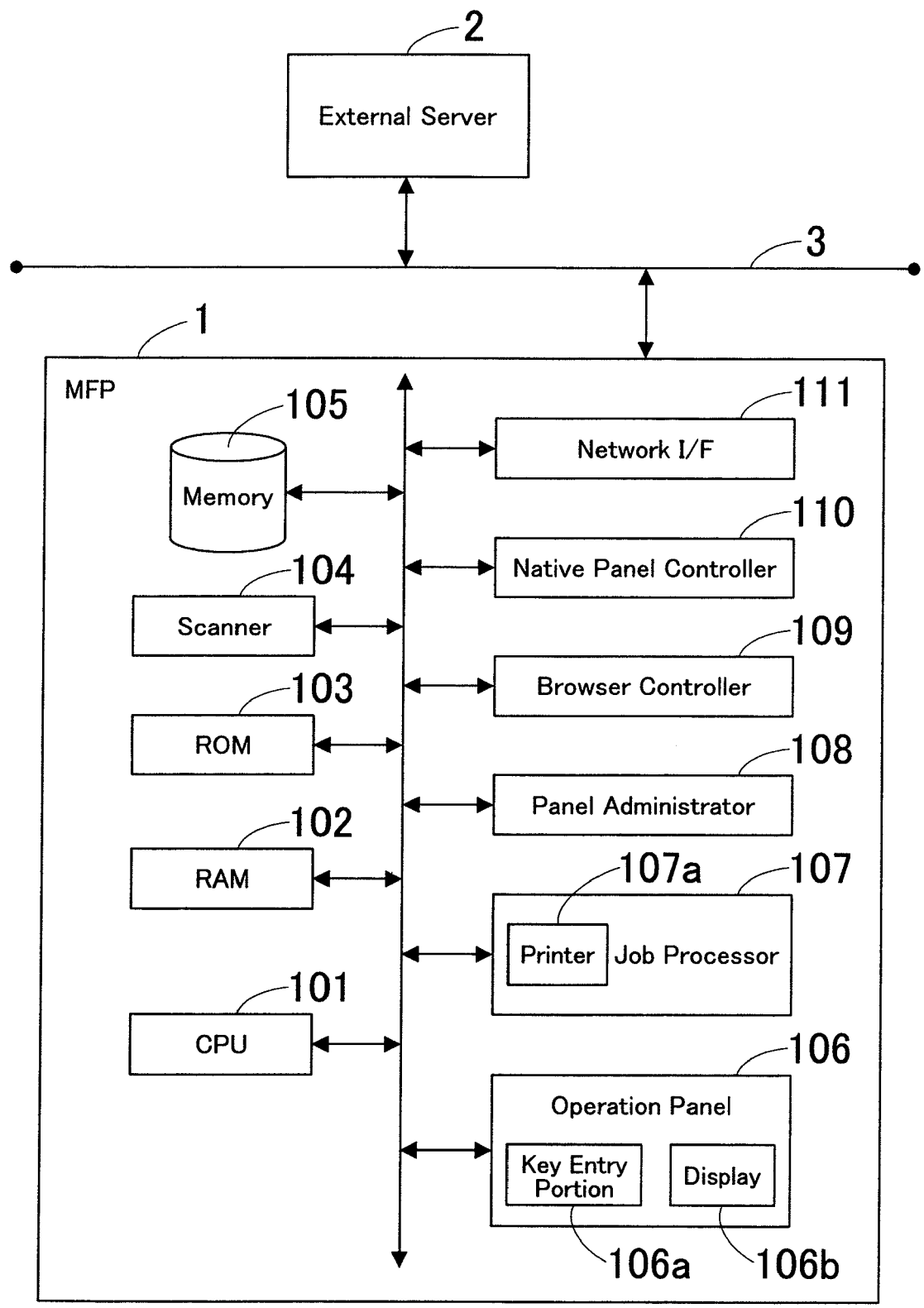
FIG. 1 is a block diagram showing an example of an image processing system, in which an image processing apparatus according to one embodiment of the present invention is employed.

As referred to the block diagram of FIG. 1, showing an image processing system in which an image processing apparatus according to one embodiment of the present invention is employed, the image processing system includes an image processing apparatus 1 and an external server 2, and this image processing apparatus 1 and this external server 2 are interconnected via a network 3.

In this embodiment, a MFP that is a multifunctional digital image forming apparatus collectively having the copy function, the print function, the FAX function and other functions as described above, is employed as the image forming apparatus 1. Hereinafter, the image processing apparatus 1 also will be referred to as "MFP 1".

The external server 2 is constructed of a personal computer. The external server 2 accumulates in itself, data of a plurality of documents that can be printed by the MFP 1, and includes a HTTP server to provide information stored in the server itself to the MFP 1, over HTTP. As will be described in more detail below, users can manipulate data stored in the external server 2 and perform an operation to issue a job to be executed by the MFP 1.

In this embodiment, a job issued by the external server 2 then executed by the MFP 1 is a print job, which does not mean that the job should be limited to a print job.

As shown in FIG. 1, the MFP 1 includes a CPU 101, a RAM 102, a ROM 103, a scanner 104, a memory 105, an operation panel 106, a job processor 107, a panel administrator 108, a browser controller 109, a native panel controller 110, a network interface (I/F) 111, and others.

The CPU 101 centrally controls the entire MFP 1. The ROM 103 is a recording medium that records in itself an operation program for the CPU, and other data. The RAM 102 provides an operation area for the CPU 101 to execute the operation program recorded in the ROM 103.

The scanner 104 reads an image on a document and converts it into electronic data that is image data.

The memory 105 records in itself, image data read out by the scanner 104, print data received from an external apparatus such as the external server 2, and other data, according to a need. The memory 105 is constructed of a recording medium such as a hard disk drive.

The operation panel 106 has a key entry portion 106a that includes numeric keys, a start key and other keys, and a display 106b that is constructed of a liquid crystal display with touch panel functionality. And the operation panel 106 is used by users for login operation, various entry operations and other operations, and displays mode screens of the MFP 1 and messages for users.

The job processor 107 prints out image data read out by the scanner 104 from a document, and receives and executes a print job issued by the external server 2. The job processor 107 includes a printer 107a that prints out subject data to be printed. Furthermore, the job processor 107 has a function to detect whether or not a print job issued by the external server 2 is successfully received, and a function to detect a job execution status that indicates whether a job is completely executed or an error occurs, for example.

The panel administrator 108 performs the operations to be described later, by the mode that allows the MFP 1 to issue and execute a print job specified via a job instruction screen of the external server 2, which is displayed via a browser on the display 106b of the operation panel 106 of the MFP 1, in other words, by the mode that allows the MFP 1 to instruct the external server 2 to issue a job to be executed by the MFP 1 itself (hereinafter, this mode also will be referred to as "remote job instruction mode"). More concretely, a URL (Uniform Resource Locator) holding screen data of an appropriate screen to be displayed on the display 106b of the operation panel 106 is identified, based on a result of job receipt and/or a job execution status detected by the job processor 107. Then this URL is transmitted to the browser controller 109.

The browser controller 109 displays HTML data that is obtained from the external server 2 on the display 106b of the operation panel 106 by accessing via a browser that is application software to view Web pages, predetermined URLs including the URL received from the panel administrator 108, and also displays a screen on the display 106b based on screen data received from the external server 2. Furthermore, the browser controller 109 transmits a request to the external server 2 according to a user operation performed via the displayed screen.

The native panel controller 110 controls what is displayed on the display 106b of the operation panel 106, when the MFP 1 employs the normal use mode instead of the remote job issuance mode.

The network interface 111 serves to communicate with an external apparatus such as the external server 2, via the network 3.

Figure 2:
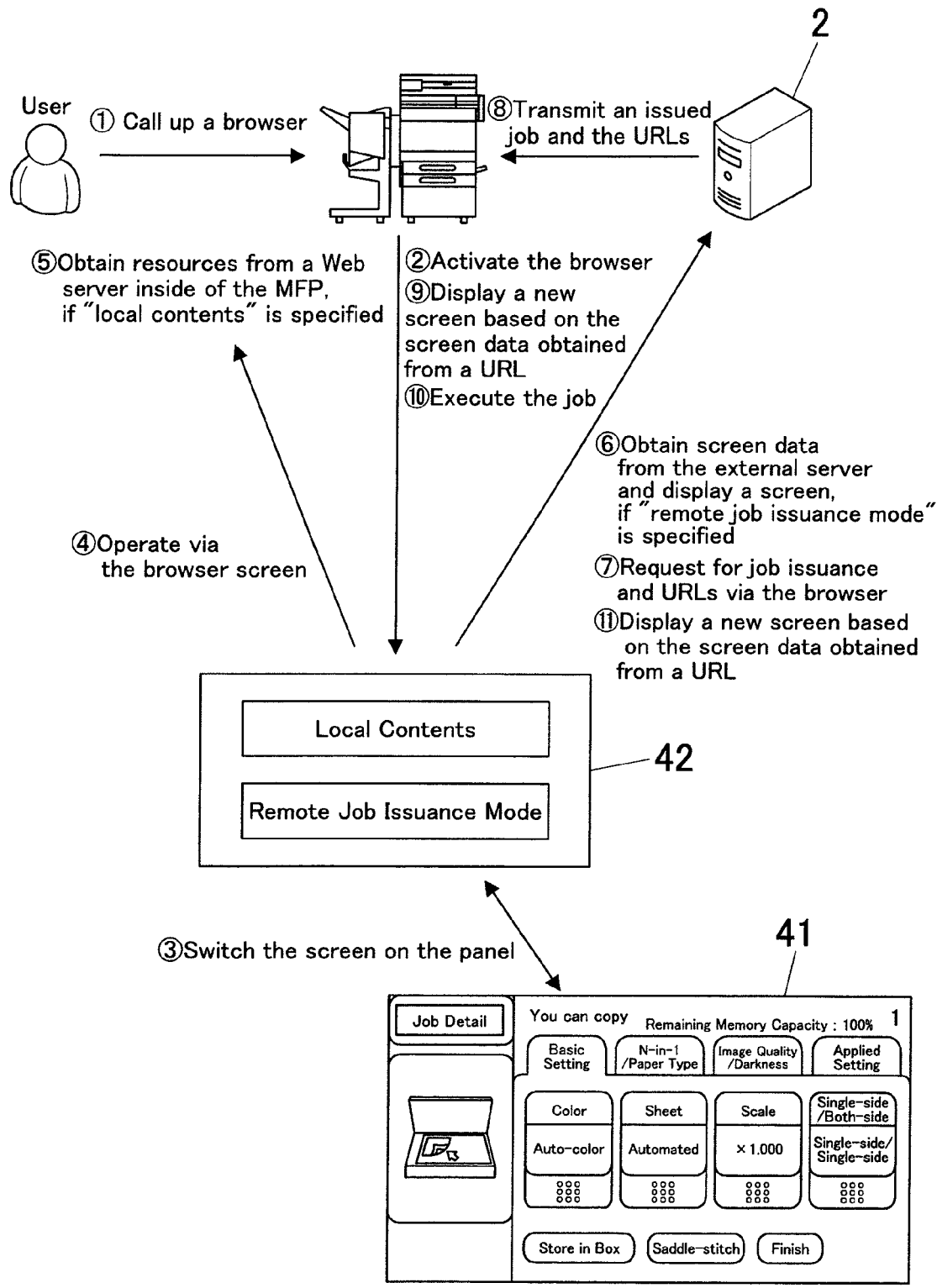
FIG. 2 is a view to explain the operations performed in the entire image processing system when the remote job instruction mode is employed.

FIG. 2 is a view to explain the operations performed in the entire image processing system when the MFP 1 employs the remote job issuance mode.

A user calls up a browser by operating the operation panel 106 of the MFP 1 (circled number 1 in FIG. 2). Then the MFP 1 activates the browser (circled number 2). By activation of the browser, a screen 41 (native screen) of the normal use mode, not of the remote job issuance mode, which is displayed on the display 106b of the operation panel 106, is switched to a top screen 42 (browser screen) of the browser (circled number 3). In this top screen 42, a button of "local contents" that is a mode to make only the MFP 1 to implement a procedure from job issuance until job execution and a button of the previously described "remote job issuance mode" are displayed.

The user selects a mode by operating the browser screen (circled number 4). When the user presses the button of "local contents", the MFP 1 obtains resources from its internal Web server (circled number 5).

If the user presses the button of "remote job issuance mode", screen data of a job instruction screen is obtained from the external server 2, then a job instruction screen is displayed on the display 106b, via the browser (circled number 6).

The user selects a subject document to be printed and gives an instruction to issue print job via the job instruction screen displayed thereon, then a CGI request is transmitted and thus the external server 2 is requested to issue a print job (circled number 7). At the same time, the external server 2 is requested to provide URLs holding screen data of screens that match respective results of job receipt and/or job execution statuses (circled number 7).

For example, the screens matching respective results of job receipt and/or job execution statuses include the one that tells the MFP 1 successfully receives or fails receiving the job issued by the external server 2, the one that tells the job is now being executed, the one that tells the job is successfully and completely executed, the one that tells an error occurs, the one that tells an error type, and others. In this embodiment, a plurality of locations holding screen data of such screens are collectively requested for.

Receiving a job issuance request from the MFP 1, the external server 2 issues a print job and transmits it to the MFP 1 (circled number 8). At the same time, the external server 2 transmits thereto, URLs holding screen data of screens that match respective results of job receipt and/or job execution statuses (circled number 8).

Receiving the print job issued by the external server 2, the MFP 1 detects whether "successful receipt" or "unsuccessful receipt". And the MFP 1 selects among the URLs obtained from the external server 2, a URL holding screen data of the screen that tells the MFP 1 successfully received or failed receiving the print job issued by the external server 2, and obtains the screen data by accessing that URL. Then, the MFP 1 switches the screen currently displayed on the display 106b, to a job successful receipt screen or a job unsuccessful receipt screen, based on the screen data obtained from the URL (circled number 9).

If successfully receives the print job, the MFP 1 executes the print job (circled number 10).

Subsequently, the MFP 1 detects a job execution status. If the job is now being executed, the MFP 1 selects among the URLs obtained from the external server 2, a URL holding screen data of the screen that tells the job is now being executed, and obtains the screen data by accessing that URL. Then, the MFP 1 switches the screen currently displayed on the display 106b, to the screen that tells the job is now being executed, based on the screen data obtained from the URL (circled number 11).

If an error occurs, the MFP 1 selects among the URLs obtained from the external server 2, a URL holding screen data of the screen that tells an error occurs or the screen that tells an error type, and obtains the screen data by accessing that URL. Then, the MFP 1 switches the screen currently displayed on the display 106b, to the screen matching the job execution status, based on the screen data obtained from the external server 2 (circled number 11).

Meanwhile, if the job is completely and successfully executed, the MFP 1 selects a URL holding screen data of the screen that notifies of a successful job execution, and obtains the screen data by accessing that URL. Then the MFP 1 switches the screen currently displayed on the display 106b, to the screen that notifies of a successful job execution, based on the screen data obtained from the external server 2 (circled number 11).

Figure 3:
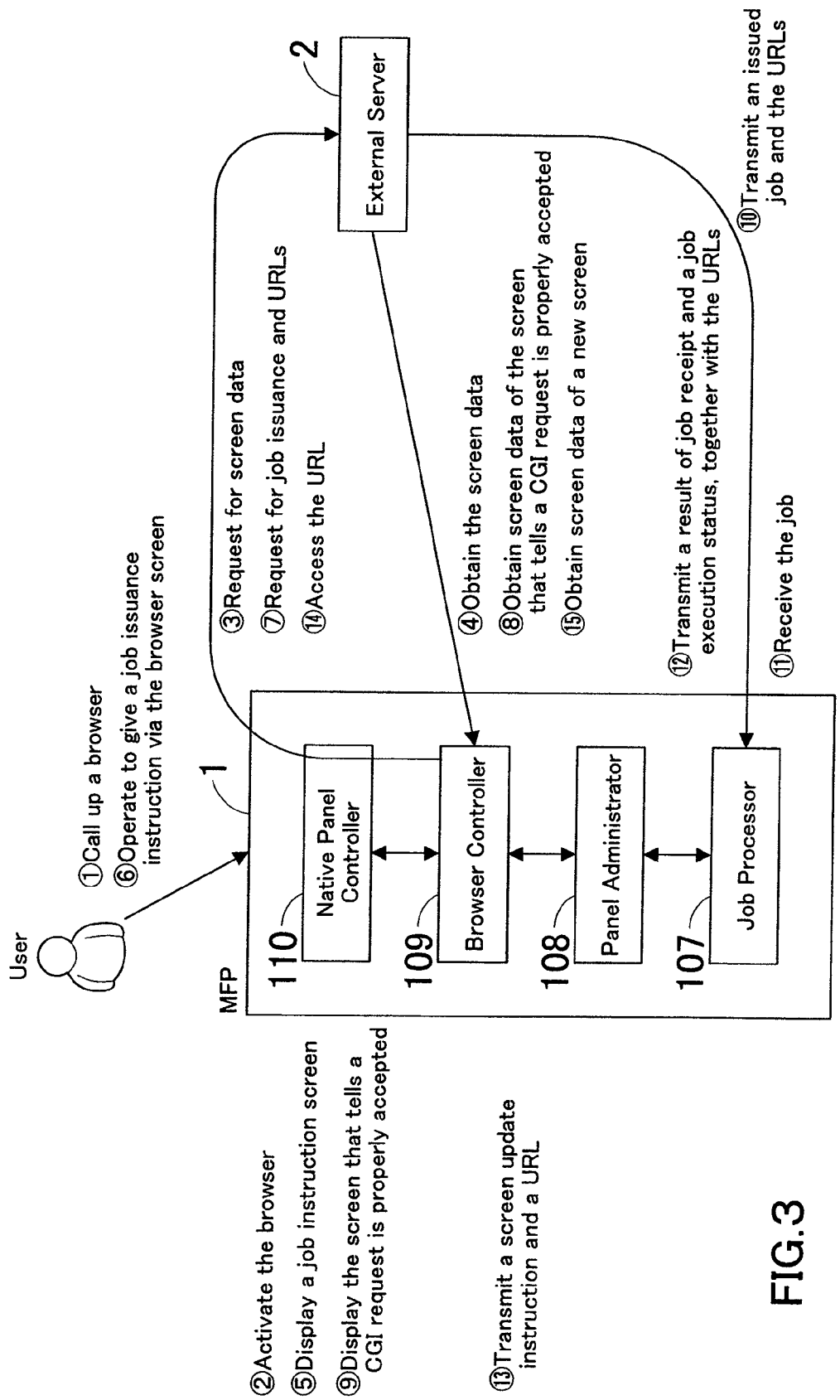
FIG. 3 is a view to explain the operations performed inside of the MFP 1 by the remote job instruction mode.

FIG. 3 is a view to explain the operations performed inside of the MFP 1 by the remote job issuance mode.

A user calls up a browser via a native screen displayed on the operation panel 106 of the MFP 1 (circled number 1 in FIG. 3). Then the browser controller 109 activates the browser and switches the native screen displayed on the display 106b, to the top screen 42 that is a browser screen shown in FIG. 4 (A) (circled number 2). Via this top screen 42, the remote job issuance mode and the local contents mode can be selected.

Figure 4A:
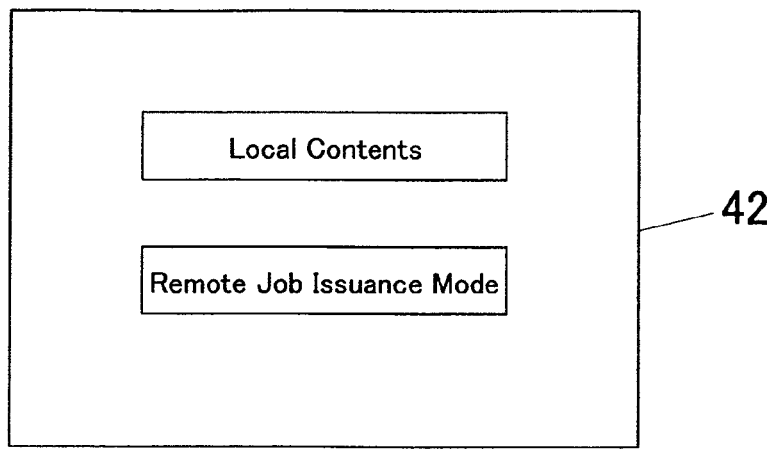
FIGS. 4A, 4B, and 4C depict screen views to explain how the screen displayed on a display of an operation panel changes.
Figure 4B:
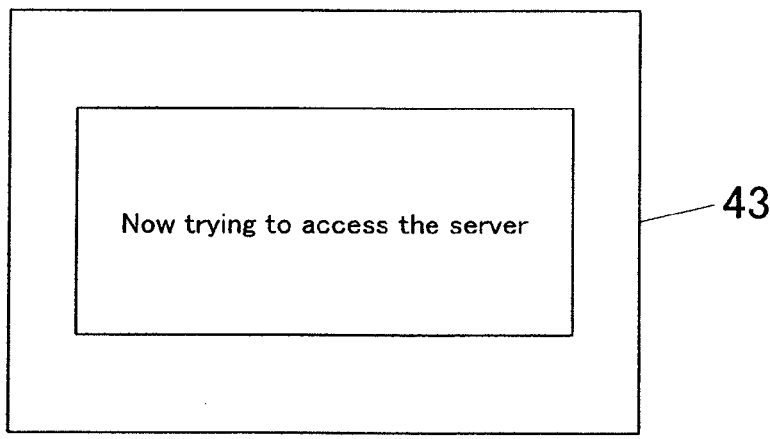
Figure 4C:
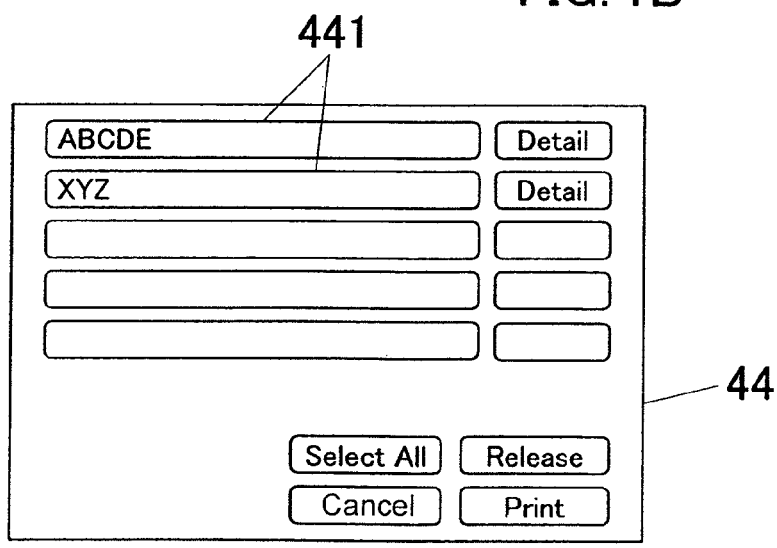

The user selects the remote job issuance mode via the top screen 42. Then the browser controller 109 makes the MFP 1 access the external server 2 and requests the external server 2 to provide screen data of the job instruction screen (circled number 3). Until an access to the external server 2 is made, a screen 43 that tells the MFP 1 is now trying to access, as shown in FIG. 4 (B), is displayed on the display 106b of the operation panel 106.

When an access to the external server 2 is made, screen data of the job instruction screen is transmitted by the external server 2 (circled number 4). Then the browser controller 109 makes the display 106b of the operation panel 106 display the job instruction screen 44 that is usually supposed to be displayed on the external server 2, based on the screen data (circled number 5). FIG. 4 (C) shows the job instruction screen 44 that is usually supposed to be displayed on the external server 2. In this screen 44, a list 441 of document data that can be printed out, which is stored in the external server 2, and also a "print" button, a "cancel" button, a "select all" button and etc. are displayed.

The user gives an instruction to issue a job by selecting a document and pressing the "print" button via the job instruction screen 44 (circled number 6). Then the browser controller 109 transmits a CGI request and thus the external server 2 is requested to issue a print job (circled number 7). At the same time, the external server 2 is requested to provide a plurality of URLs holding screen data of screens that match respective results of job receipt and/or job execution statuses.

Receiving a job issuance request, the external server 2 transmits to the MFP 1, screen data of the screen that tells the CGI request is properly accepted (circled number 8). Then the browser controller 109 makes the display 106b display the screen that tells the CGI request is properly accepted (circled number 9).

And also, receiving a job issuance request from the MFP 1, the external server 2 issues a print job and transmits it to the MFP 1, and at the same time, transmits to the MFP 1, data of a list of URLs holding screen data of screens that match respective results of job receipt and/or job execution statuses (circled number 10).

FIG. 5 shows an example of a list of URLs. In this example, URLs holding screen data of a job successful receipt screen, a job unsuccessful receipt screen, a job execution screen, a paper jam error screen, a toner empty error screen, a paper empty error screen, a job completion screen and other screens, are listed.

In the MFP 1, the network interface 111 receives the issued job and information of the URLs, and transmits the received job and information of the URLs to the job processor 107. And the job processor 107 receives them (circled number 11).

The job processor 107 detects a result of job receipt, and makes the printer 107a execute the print job, and further detects a job execution status. Then the job processor 107 transmits the detected result of job receipt and job execution status to the panel administrator 108, together with the information of all the URLs received from the external server 2 (circled number 12).

The panel administrator 108 selects among the information of the URLs, a URL holding screen data of a new screen that matches the received result of job receipt and job execution status, and transmits information of the selected URL to the browser controller 109, together with a screen update instruction (circled number 13).

According to the screen update instruction, the browser controller 109 accesses the URL holding screen data of the new screen (circled number 14), and thereby obtains screen data of the new screen from the external server 2 (circled number 15).

Concretely, if the result of job receipt, which is transmitted to the panel administrator 108 from the job processor 107, is detected as "successful receipt", the browser controller 109 accesses a URL holding screen data of the screen that tells the job is successfully received, and updates the screen to display the screen 45 that tells the job is successfully received, on the display 106b of the operation panel 106, as shown in FIG. 6 (A). However, a timeout period is often set when a request for HTML data is transmitted over HTTP, and if no data has been received from the server within the timeout period, the screen may be switched back to a native screen. If the screen is already back to a native screen when accessing a URL holding screen data of the screen that tells the job is successfully received, the browser controller 109 switches the native screen to a browser screen to display the new screen.

If the job execution status transmitted to the panel administrator 108 from the job processor 107 is detected as "under execution", the browser controller 109 accesses a URL holding screen data of the screen that tells the job is now being executed, and updates the screen to display the screen 46 that tells the job is now being executed, on the display 106b of the operation panel 106, as shown in FIG. 6 (B).

Figure 7A:
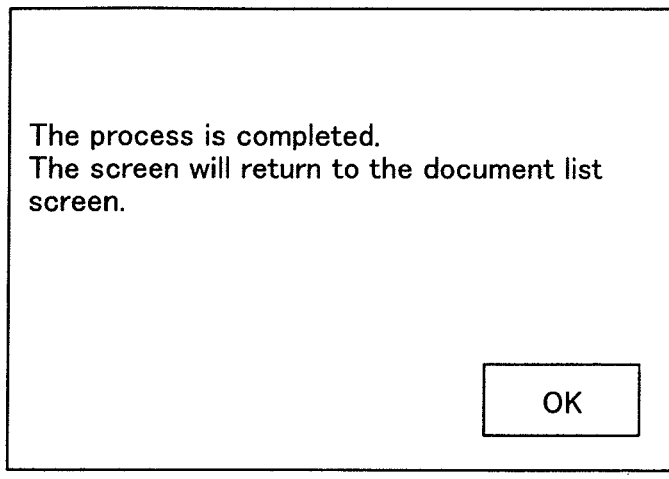
FIGS. 7A and 7B depict screens to explain how the screen displayed on a display of an operation panel changes.
Figure 7B:
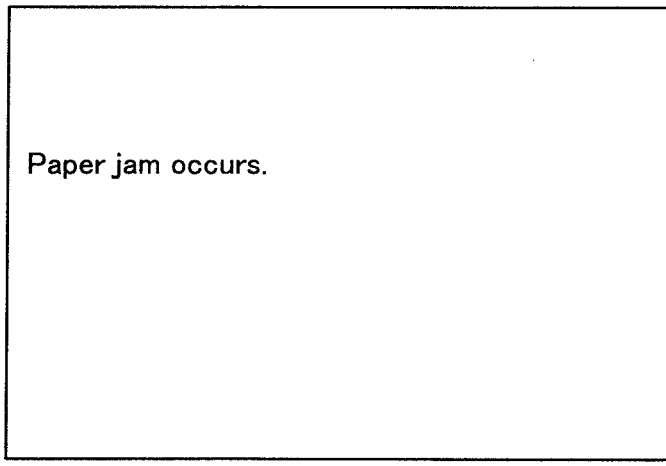

If the job execution status transmitted to the panel administrator 108 from the job processor 107 is detected as "execution completed" the browser controller 109 accesses a URL holding screen data of the screen that tells the job is completely executed, and updates the screen to display the screen 47 that tells the job is completely executed, on the display 106b of the operation panel 106, as shown in FIG. 7 (A).

If the job execution status transmitted to the panel administrator 108 from the job processor 107 is detected as "paper jam error", the browser controller 109 accesses a URL holding screen data of the screen that tells a paper jam error occurs, and updates the screen to display the screen 48 that tells a paper jam error occurs, on the display 106b of the operation panel 106, as shown in FIG. 7 (B). However, an error type is not limited to "paper jam". Thus, a screen that matches an error type such as a toner empty or a paper empty, is displayed thereon.

Figure 8:
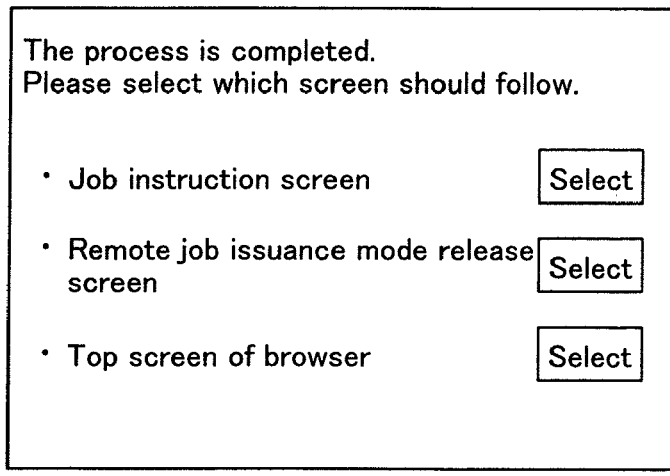
FIG. 8 is also a view showing screens to explain how the screen displayed on a display of an operation panel changes.

After the job is completely executed, as shown in FIG. 8, the browser controller 109 may display a selection screen 49 to allow the user to select which screen should follow, the job instruction screen, the remote job issuance mode release screen, or the top screen. And when the user selects any of the screens, the browser controller 109 may access a URL holding screen data of the screen, and display the screen thereon. Since screen data is obtained according to user selection in this way, a user's preferable screen is displayed thereon.

As described above, a screen that matches a result of job receipt and/or a job execution status is displayed on the display. Thus, users are allowed to know whether or not a job is successfully transmitted by the external server 2 (successfully received by the MFP 1) and/or whether a job is successfully executed or an error occurs, which could enhance user convenience.

Figure 9:
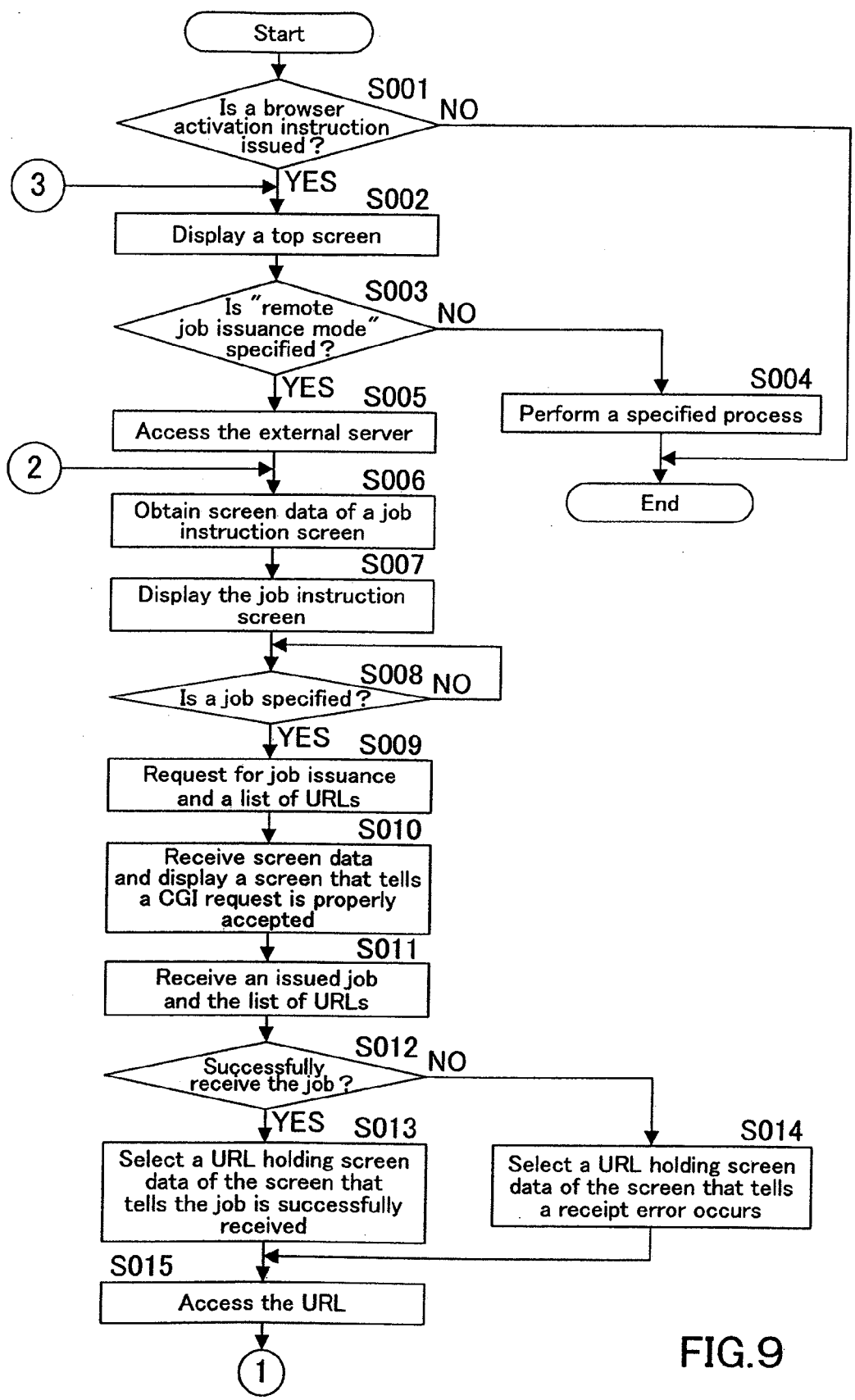
FIG. 9 is a flowchart representing a procedure executed in the MFP 1 by the remote job instruction mode.

FIG. 9 is a flowchart representing a procedure executed in the MFP 1 by the remote job issuance mode.

From a point of view of functional operations, this procedure is executed by the job processor 107, the panel administrator 108, the browser controller 109 and etc. of the MFP 1. However, it is practically executed by the CPU according to an operation program recorded in a recording medium such as the ROM.

In Step S001, it is judged whether or not a browser activation instruction is issued by a user. If such an instruction is not issued (NO in Step S001), the routine terminates. If such an instruction is issued (YES in Step S001), the top screen of the browser is displayed in Step S002.

Then in Step S003, it is judged whether or not "remote job issuance mode" is specified via the top screen. If "local contents" is specified (NO in Step S003), a specified process is performed in Step S004, then the routine terminates.

If "remote job issuance mode" is specified (YES in Step S003), an access to the external server 2 is made in Step S005. And screen data of the job instruction screen is obtained from the external server 2 in Step S006, then the job instruction screen is displayed in Step S007.

Then in Step S008, it is judged whether or not a job is specified by the user via the job instruction screen. If no job is specified (NO in Step S008), the routine waits until a job is specified.

If a job is specified (YES in Step S008), a request for job issuance and a list of URLs holding screen data of screens that match respective results of job receipt and job execution statuses, is transmitted to the external server 2, in Step S009.

In Step S010, screen data of the screen that tells the CGI request is properly accepted is received from the external server 2 and the screen is displayed on the display 106*b* of the operation panel 106. And then, an issued job and data of a list of the URLs are received from the external server 2, in Step S011.

In Step S012, it is judged whether or not the job is successfully received. If it is successfully received (YES in Step S012), the routine proceeds to Step S013, in which a URL holding screen data of the screen that tells the job is successfully received, is selected among the data of a list of the URLs. Then the routine proceeds to Step S015. If the job is not successfully received (NO in Step S012), the routine proceeds to Step S014, in which a URL holding screen data of the screen that tells a receipt error occurs, is selected among the data of a list of the URLs. Then the routine proceeds to Step S015.

Figure 10:
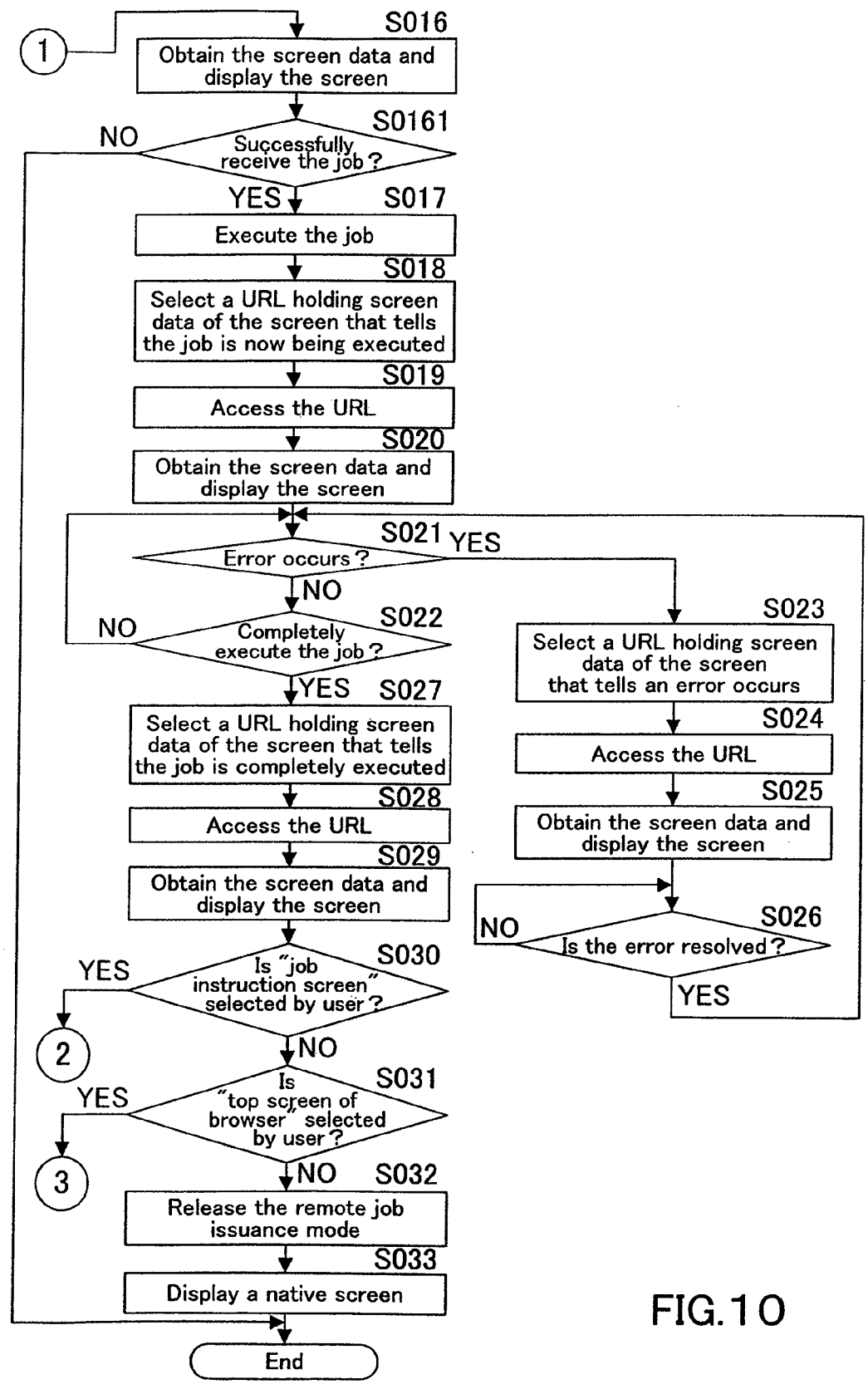
FIG. 10 is a flowchart continued from FIG. 9.

In Step S015, an access to the selected URL is made. And screen data of the screen is obtained therefrom and the screen is displayed on the display 106*b*, in Step S016 of FIG. 10.

Subsequently in Step S0161, it is judged again, whether or not the job is successfully received. If it is not successfully received (NO in Step S0161), the routine terminates. If it is successfully received (YES in Step S0161), a print job is executed by the printer 107 in Step S017.

Then in Step S018, a URL holding screen data of the screen that tells the job is now being executed, is selected among the data of a list of the URLs. After that, an access to the URL is made in Step S019. And screen data of the screen is obtained therefrom and the screen is displayed on the display 106*b*, in Step S020.

Then in Step S021, it is judged whether or not an error occurs. If an error occurs (YES in Step S021), the routine proceeds to Step S023, in which a URL holding screen data of the screen that tells an error occurs and matches a type of the error, is selected among the data of a list of the URLs. After that, an access to the URL is made in Step S024. And screen data of the screen is obtained therefrom and the screen is displayed on the display 106*b*, in Step S025.

Then in Step S026, it is judged whether or not the error is resolved. If the error is not resolved (NO in Step S026), the routine waits until it is resolved. If the error is resolved (YES in Step S026), the routine goes back to Step S021.

Meanwhile, in Step S021, if no error occurs (NO in Step S021), it is judged in Step S022, whether or not the job is completely executed. If the job is not completely executed (NO in Step S022), the routine goes back to Step S21.

If the job is completely executed (YES in Step S022), the routine proceeds to Step S027, in which a URL holding screen data of the screen that tells the job is completely executed, is selected among the data of a list of the URLs. After that, an access to the URL is made in Step S028. And screen data of the screen is obtained therefrom and the screen is displayed on the display 106*b*, in Step S029.

Then in Step S030, it is judged whether or not the job instruction screen is selected by the user via the job completion screen, as the following screen. If the job instruction screen is selected (YES in Step S030), the routine proceeds to Step S006 of FIG. 9.

If the job instruction screen is not selected (NO in Step S030), then it is judged in Step S031, whether or not the top screen of the browser is selected by the user. If the top screen is selected (YES in Step S031), the routine proceeds to Step S002 of FIG. 9.

If the top screen is not selected (NO in Step S031), since this means the remote job issuance mode release screen is selected, the remote job issuance mode is released in Step S032, and a native screen is displayed thereon in Step S033. Then the routine terminates.

All the above described relates to one embodiment of the present invention, however, the present invention is not limited to this embodiment.

For example, in this embodiment, data of a list of URLs holding screen data of screens that match respective results of job receipt and/or job execution statuses, and issuance of a job are requested together, and a URL holding screen data of a screen that matches a result of job receipt and/or a job execution status is selected among the obtained data of a list of the URLs, then the screen data is obtained from the URL. Alternatively, another configuration may be employed, wherein every time when screen data of a screen that matches a result of job receipt and/or a job execution status is needed, a URL holding such screen data is obtained from the external server 2 and an access to the URL is made. Although, the method in which a plurality of URLs are preliminarily obtained and an appropriate URL is selected among them, then screen data is obtained from the URL, would allow a screen that matches a result of job receipt and/or a job execution status, to be displayed on the display 106*b*, earlier than the method in which screen data is obtained every time when needed.

Furthermore, in this embodiment, a URL holding screen data of a screen that matches a result of job receipt and/or a job execution status is obtained from the external server 2, and an access to the URL is made, and thereby the screen data is obtained, then the screen displayed on the display 106b is updated to a new screen based on the screen data. Alternatively, another configuration may be employed, wherein the panel administrator 108 creates text data of a text that matches a result of job receipt and/or a job execution status, which are detected by the job processor 107, or selects such a text among text data preliminarily stored, then the text is displayed on the display 106b, via which users are allowed to know a result of job receipt and/or a job execution status.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
a display that accesses an external server via a browser, and displays on itself via the browser, a job instruction screen of the external server, based on screen data of the job instruction screen, which is received from the external server;
a job issuance requester that requests the external server to issue a job that is specified by a user via the job instruction screen of the external server, which is displayed on the display;
a receiver that receives the job that is issued by the external server in response to the request of the job issuance requester;
a job executor that executes the received job;
a detector that detects a result of the job receipt by the receiver and/or a job execution status of the job execution by the job executor;
a display controller that makes the display to display a screen that matches the detected result of job receipt and/or job execution status; and
a location requester that requests the external server to provide a location holding screen data that matches the result of job receipt and/or the job execution status;
wherein
the location requester requests the external server to provide a location holding screen data, concurrently with the job issue request of the job issuance requester, and
wherein
the display controller obtains screen data that matches the result of job receipt and/or the job execution status, from the location that is provided by the external server in response to the request of the location requester, and then makes the display to display the screen for the screen data.

2. The image processing apparatus recited in claim 1, wherein:
the display controller obtains screen data of the screen from the location provided by the external server, when the job executor stops executing the job.

3. The image processing apparatus recited in claim 1, wherein:
the location requester requests for providing a plurality of locations holding screen data of screens that match respective results of job receipt and/or respective job execution statuses; and
the display controller selects among the plurality of locations, a location holding screen data of a screen that matches a result of job receipt and/or a job execution status, then obtains screen data of the screen from the location.

4. The image processing apparatus recited in claim 3, wherein:
the job execution status indicates whether a normal operation or an error, or alternatively, a type of an error.

5. The image processing apparatus recited in claim 1, wherein:
the location requester requests for providing a plurality of locations holding screen data of screens that match respective results of job receipt and/or respective job execution statuses; and
the display controller obtains screen data of a screen selected by a user, from one of the plurality of locations.

6. The image processing apparatus recited in claim 5, wherein:
screen data of the screen selected by a user corresponds to screen data of the job instruction screen, screen data of a mode closing screen of a job execution mode, by which the job issued by the external server is executed, or screen data of a top screen of the browser, which is to be displayed after the job issued by the external server is completely and successfully executed.

7. The image processing apparatus recited in claim 1, wherein:
the job issued by the external server corresponds to a print job.

8. A job execution method of an image processing apparatus, comprising:
- accessing an external server via a browser, and displaying on a display via the browser, a job instruction screen of the external server, based on screen data of the job instruction screen, which is received from the external server;
- requesting the external server to issue a job that is specified by a user via the job instruction screen of the external server, which is displayed on the display;
- receiving the job that is issued by the external server in response to the recent job issuance request;
- executing the received job;
- detecting a result of the recent job receipt and/or a job execution status of the recent job execution;
- making the display to display a screen that matches the detected result of job receipt and job execution status; and
- requesting the external server to provide a location holding screen data of a screen that matches a result of job receipt and/or a job execution status and is to be displayed on the display, and wherein:
- the external server is requested to issue the job, and concurrently therewith, the external server is requested to provide a location holding screen data of the screen, and wherein
- screen data of a screen that matches a result of job receipt and/or a job execution status, is obtained from the location that is provided by the external server in response to the recent location request, and then the screen is displayed on the display.

9. The job execution method of an image processing apparatus, recited in claim 8, wherein:
- screen data of the screen is obtained from the location provided by the external server, when execution of the job is stopped.

10. The job execution method of an image processing apparatus, recited in claim 8, wherein:
- a plurality of locations holding screen data of screens that match respective results of job receipt and/or respective job execution statuses, are requested for; and
- a location holding screen data of a screen that matches a result of job receipt and/or a job execution status, is selected among the plurality of locations, then screen data of the screen is obtained from the location.

11. The job execution method of an image processing apparatus, recited in claim 10, wherein:
- the job execution status indicates whether a normal operation or an error, or alternatively, a type of an error.

12. The job execution method of an image processing apparatus, recited in claim 8, wherein:
- a plurality of locations holding screen data of screens that match respective results of job receipt and/or respective job execution statuses, are requested for; and
- screen data of a screen selected by a user, is obtained from one of the plurality of locations.

13. The job execution method of an image processing apparatus, recited in claim 12, wherein:
- screen data of the screen selected by a user corresponds to screen data of the job instruction screen, screen data of a mode closing screen of a job execution mode, by which the job issued by the external server is executed, or screen data of a top screen of the browser, which is to be displayed after the job issued by the external server is completely and successfully executed.

14. The job execution method of an image processing apparatus, recited in claim 8, wherein:
- the job issued by the external server corresponds to a print job.

15. A non-transitory computer readable recording medium having a job execution program recorded therein to make a computer of an image processing apparatus execute:
- accessing an external server via a browser, and displaying on a display via the browser, a job instruction screen of the external server, based on screen data of the job instruction screen, which is received from the external server;
- requesting the external server to issue a job that is specified by a user via the job instruction screen of the external server, which is displayed on the display;
- receiving the job that is issued by the external server in response to the recent job issuance request;
- executing the received job;
- detecting a result of the recent job receipt and/or a job execution status of the recent job execution;
- making the display to display a screen that matches the detected result of job receipt and job execution status; and
- requesting the external server to provide a location holding screen data of a screen that matches a result of job receipt and/or a job execution status and is to be displayed on the display, and wherein:
- the external server is requested to issue the job, and concurrently therewith, the external server is requested to provide a location holding screen data of the screen, and wherein
- screen data of a screen that matches a result of job receipt and/or a job execution status, is obtained from the location that is provided by the external server in response to the recent location request, and then the screen is displayed on the display.

16. The computer readable recording medium recited in claim 15, having a job execution program recorded therein, wherein:
- screen data of the screen is obtained from the location provided by the external server, when execution of the job is stopped.

17. The computer readable recording medium recited in claim 15, having a job execution program recorded therein, wherein:
- a plurality of locations holding screen data of screens that match respective results of job receipt and/or respective job execution statuses, are requested for; and
- a location holding screen data of a screen that matches a result of job receipt and/or a job execution status, is selected among the plurality of locations, then screen data of the screen is obtained from the location.

18. The computer readable recording medium recited in claim 17, wherein:
- the job execution status indicates whether a normal operation or an error, or alternatively, a type of an error.

19. The computer readable recording medium recited in claim 15, having a job execution program recorded therein, wherein:
- a plurality of locations holding screen data of screens that match respective results of job receipt and/or respective job execution statuses, are requested for; and
- screen data of a screen selected by a user, is obtained from one of the plurality of locations.

20. The computer readable recording medium recited in claim 19, wherein:

screen data of the screen selected by a user corresponds to screen data of the job instruction screen, screen data of a mode closing screen of a job execution mode, by which the job issued by the external server is executed, or screen data of a top screen of the browser, which is to be displayed after the job issued by the external server is completely and successfully executed.

21. The computer readable recording medium recited in claim 15, wherein:

the job issued by the external server corresponds to a print job.

\* \* \* \* \*